United States Patent
Yamada (10) Patent No.: US 8,048,768 B2
(45) Date of Patent: Nov. 1, 2011

(54) JOINED WAFER, FABRICATION METHOD THEREOF, AND FABRICATION METHOD OF SEMICONDUCTOR DEVICES

(75) Inventor: Shigeru Yamada, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 80 days.

(21) Appl. No.: 12/458,149

(22) Filed: Jul. 1, 2009

(65) Prior Publication Data

US 2010/0009491 A1    Jan. 14, 2010

(30) Foreign Application Priority Data

Jul. 9, 2008   (JP) ................................ 2008-179121

(51) Int. Cl.
  *H01L 21/30*   (2006.01)
  *H01L 21/46*   (2006.01)
(52) U.S. Cl. ............. 438/455; 156/273.3; 257/E21.122; 257/E21.567; 438/68; 438/456; 438/460; 438/462
(58) Field of Classification Search ............... 156/273.3; 257/E21.122, E21.567; 438/68, 455, 456, 438/460, 462
See application file for complete search history.

(56) References Cited

U.S. PATENT DOCUMENTS

| 6,168,965 B1 * | 1/2001 | Malinovich et al. | 438/66 |
| 2007/0080418 A1 * | 4/2007 | Ryu | 257/459 |
| 2008/0083980 A1 * | 4/2008 | Yang et al. | 257/700 |
| 2008/0191335 A1 * | 8/2008 | Yang et al. | 257/680 |
| 2008/0211075 A1 * | 9/2008 | Yang et al. | 257/680 |

FOREIGN PATENT DOCUMENTS

| JP | 2004-207461 | 7/2004 |
| JP | 2007-282137 | 10/2007 |

* cited by examiner

*Primary Examiner* — Asok Sarkar
(74) *Attorney, Agent, or Firm* — Rabin & Berdo, PC (57) ABSTRACT

A method of fabricating a joined wafer has an exposure process which comprises a device formed-area exposure process of exposing by a stepper such that parts of the photosensitive adhesive layer formed over a surface of the transparent wafer or the device formed wafer are removed, the parts corresponding to the device formed areas when the transparent wafer and the device formed wafer are stuck together; and a wafer periphery exposure process of exposing such that a portion of the photosensitive adhesive layer over the periphery of the transparent wafer is left.

5 Claims, 8 Drawing Sheets

JOINED WAFER, FABRICATION METHOD THEREOF, AND FABRICATION METHOD OF SEMICONDUCTOR DEVICES

BACKGROUND OF THE INVENTION

1. Field of the Invention

The present invention relates to a joined wafer composed of a semiconductor wafer having device formed areas in its surface and a transparent wafer which are stuck together, a fabrication method thereof, and a fabrication method of semiconductor devices comprising semiconductor chips into which the joined wafer is divided.

2. Description of the Related Art

In these years, as information processing apparatuses represented by, e.g., mobile phones become more advanced in functionality, smaller in size, and higher in component mounting density, semiconductor packages mounted in these information processing apparatuses are becoming considerably smaller. For example, as to mobile phones with a camera and digital cameras, it is desired that semiconductor packages having a solid-state image sensing device such as a CCD (Charge Coupled Device) or a CMOS (Complementary Metal Oxide Semiconductor) that are mounted in them be miniaturized. As a technology to achieve the miniaturization, a chip size packaging technology is attracting attention that realizes a package size substantially the same as the chip size.

A chip size package having an image sensing function is usually sealed with a glass substrate for reinforcement and protection. For example, Japanese Patent Application Laid-Open Publication No. 2007-282137 discloses a module for an optical device including a configuration where a solid-state image sensing device and a transparent lid are joined via an adhesive layer (see FIG. 1 of the publication). Further, Japanese Patent Application Laid-Open Publication No. 2004-207461 discloses a solid-state image sensing unit including a configuration where a solid-state image sensing device and an optical glass are joined via a junction layer (see FIG. 5 of the publication).

Conventionally, structures where a semiconductor chip having a solid-state image sensing device formed therein and a glass substrate are stuck together have been fabricated by the following process. First, a transparent wafer having flat opposite surfaces such as a glass wafer is prepared, and an adhesive is coated over one surface of the transparent wafer, where the adhesive is of a negative type. Subsequently, the adhesive coated over the transparent wafer is exposed by a stepper, that is a projection exposure apparatus, via a pattern mask on which shielding patterns each corresponding to one of device formed areas are arranged in, e.g., a matrix of two columns and two rows. Exposure by a stepper is performed multiple times while changing the exposure position so as to cover all corresponding to the device formed areas. Here, the shielding pattern is assumed to be a rectangular pattern corresponding to the shape of the solid-state image sensing device. In exposure, because irradiation light is blocked by the rectangular shielding patterns, portions corresponding to the device formed areas are not exposed.

Figure 1:
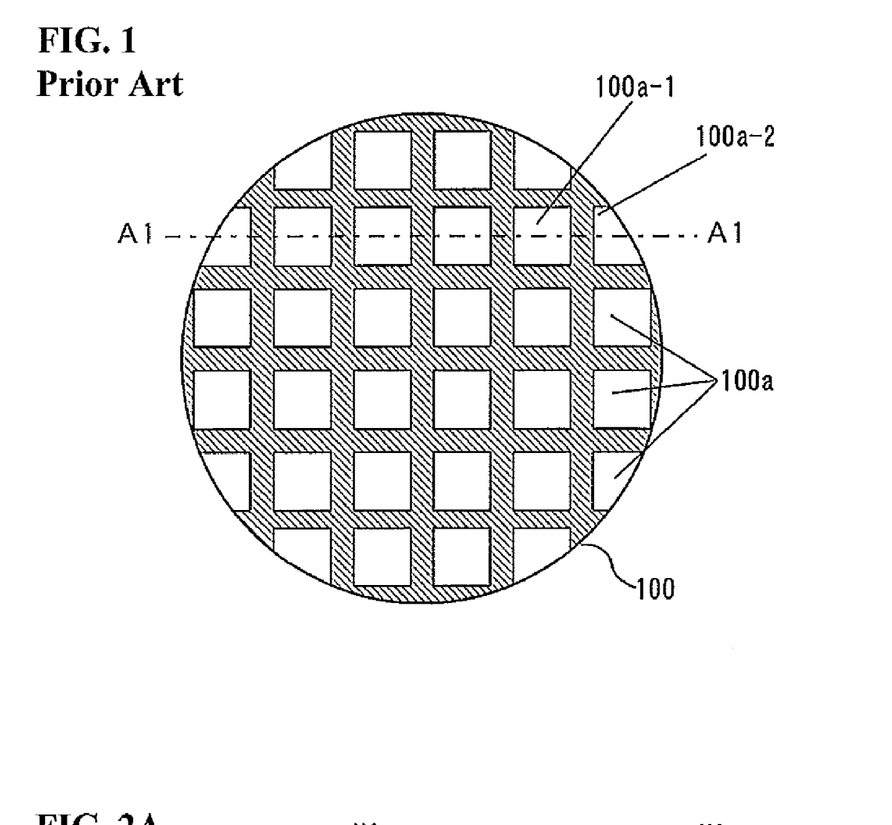
FIG. 1 is a plan view of a conventional transparent wafer and adhesive left on a surface thereof after a development process.

After exposure, non-exposed portions of the adhesive are removed from the surface of the transparent wafer by a development process. By this means, only exposed adhesive portions 200 (indicated by the hatching) are left on the surface of the transparent wafer 100 as shown in FIG. 1. Adhesive-removed portions 100a are areas corresponding to adhesive portions shielded by the rectangular shielding patterns from the irradiation light and denoted by open rectangles in the figure. Then, a semiconductor wafer having solid-state image sensing devices previously formed in the device formed areas of the surface is stuck to the transparent wafer 100 with the remaining adhesive 200 on the surface of the transparent wafer 100. Hereinafter the semiconductor wafer where the solid-state image sensing device is formed in the device formed areas is called a device formed wafer. Then, the device formed wafer is polished at the back side surface to a desired thickness.

Thereafter, semiconductor devices are finished through the process of forming electrodes and lines on the device formed wafer, the process of cutting the transparent wafer 100 and the device formed wafer into chips, and the process of making modules by fixing a lens to the divided semiconductor chips sealed with glass, and so on.

SUMMARY OF THE INVENTION

However, when exposed by a stepper, as shown in FIG. 1, the adhesive portions corresponding to areas where a solid-state image sensing device is actually formed such as area 100a-1 are removed, and also the adhesive portions corresponding to areas where a solid-state image sensing device is not actually formed such as area 100a-2 are removed. As many solid-state image sensing devices as possible are usually formed in the surface from the viewpoint of cost, but where exposure is performed while changing the exposure position so as to cover all areas corresponding to solid-state image sensing devices, the adhesive on the transparent wafer periphery where a solid-state image sensing device is not actually formed such as area 100a-2 is also removed because of the arrangement of the shielding patterns of the mask for use in exposure.

Figure 2A:
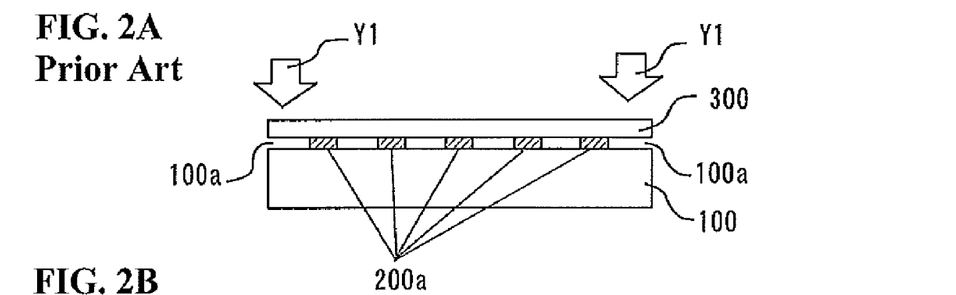
FIGS. 2A and 2B are cross-sectional views in a back side polishing step of a device formed wafer stuck to a transparent wafer according to a conventional semiconductor device fabrication method.
Figure 2B:
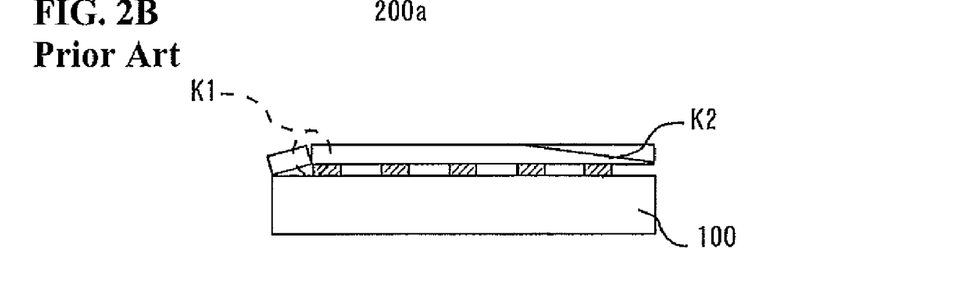

FIG. 2A is a cross-sectional view of the transparent wafer 100 and the device formed wafer 300 stuck together with the remaining adhesive 200 on the surface of the transparent wafer 100 in the back side polishing process. This cross-sectional view is taken along dot-dashed line A1 of FIG. 1. When the device formed wafer 300 is polished at the back side, as shown in FIG. 2A, pressure is applied in the direction of arrow Y1. The adhesive on portions of the periphery of the transparent wafer 100 where a solid-state image sensing device is not actually formed (adhesive-removed portion 100a-2, etc.) is also removed. Because the adhesive 200 that provides support against pressure applied in the direction of arrow Y1 is not present on the adhesive-removed portions 100a of the periphery, there is the problem that a break-off K1 or a crack K2 occurs in the device formed wafer 300 as shown in FIG. 2B. The break-off K1 often occurs in the periphery of the device formed wafer 300. In contrast, since usually the device formed wafer 300 is mainly made of silicon, the crack K2 extends along a crystal direction of the silicon to the inside of the device formed wafer 300, which causes a decrease in yield or a failure after assembled into a semiconductor device, thus decreasing the reliability of the semiconductor device.

Moreover, after the transparent wafer 100 and the device formed wafer 300 are stuck together, various chemical solution processes are performed in the steps until the cutting of the joined wafer (dividing into chips), and the chemical solution enters the inside via adhesive-removed portions 100a formed on the wafer periphery and erodes the adhesive 200 to become lees in device formed areas, or so on, which causes a decrease in yield or a failure after assembled into a semiconductor device.

The present invention has been made in view of the above problems, and an object thereof is to provide a fabrication method of a joined wafer that can improve production yields of semiconductor chips sealed with a glass substrate into which the wafer is divided after exposed by a stepper and reduce the occurrence of a failure in semiconductor devices comprising the semiconductor chips, thus improving their reliability.

According to the present invention, there is provided a method of fabricating a joined wafer, which comprises at least a wafer preparing step of preparing a transparent wafer and a device formed wafer having device formed areas in its surface; an adhesive layer forming step of forming a negative-type photosensitive adhesive layer over a surface of the transparent wafer or the device formed wafer; an adhesive layer exposure step of exposing at least a portion of the photosensitive adhesive layer formed over the transparent wafer or the device formed wafer; an adhesive layer developing step of developing the photosensitive adhesive layer formed over the transparent wafer or the device formed wafer to remove a portion thereof; and a wafer sticking step of sticking the transparent wafer and the device formed wafer together with the photosensitive adhesive layer left on the transparent wafer or the device formed wafer. The adhesive layer exposure step comprises a device formed-area exposure step of exposing by a stepper such that portions of the photosensitive adhesive layer formed over the transparent wafer or the device formed wafer are removed, the portions corresponding to the device formed areas when the transparent wafer and the device formed wafer are stuck together; and a wafer periphery exposure step of exposing such that a portion of the photosensitive adhesive layer over the periphery of the transparent wafer or the device formed wafer is left.

According to the present invention, there is provided a method of fabricating a semiconductor device, comprising at least a polishing step of polishing a joined wafer composed of a device formed wafer having device formed areas in its surface and a transparent wafer at a side of said device formed wafer; an electrode and line forming step of forming electrodes and lines to electrically connect a polished surface of the device formed wafer to light receiving devices formed in the device formed areas; and a wafer cutting step of cutting the transparent wafer and the device formed wafer along a between-device formed area remaining adhesive into chips.

According to the present invention, there is provided a joined wafer wherein shapes of areas surrounded by a portion of the photosensitive adhesive layer left over the periphery of the device formed wafer and the transparent wafer stuck together and a portion of the photosensitive adhesive layer left between adjacent ones of the device formed areas do not match the shape of the device formed areas.

According to the method of fabricating a joined wafer of the present invention, production yields of semiconductor chips sealed with a glass substrate into which the wafer is divided after exposed by a stepper can be improved, and the occurrence of a failure in semiconductor devices comprising the semiconductor chips can be reduced, thus improving their reliability.

Therefore the present invention includes a joined wafer wherein shapes of areas surrounded by a portion of the photosensitive adhesive layer left over the periphery of said device formed wafer and said transparent wafer stuck together and a portion of the photosensitive adhesive layer left between adjacent ones of said device formed areas do not match the shape of said device formed areas.

BRIEF EXPLANATION OF THE DRAWINGS

The aforementioned aspects and other features of the invention are explained in the following description, taken in connection with the accompanying drawing figures wherein:

FIG. 11 is a plan view showing the transparent wafer and adhesive left on the surface thereof after development according to the present embodiment;

FIG. 12 is a flow chart showing the process of dividing the wafer into chips;

DETAILED DESCRIPTION OF THE PREFERRED EMBODIMENT

An embodiment according to the present invention will be described in detail below with reference to the accompanying drawings.

Figure 3:
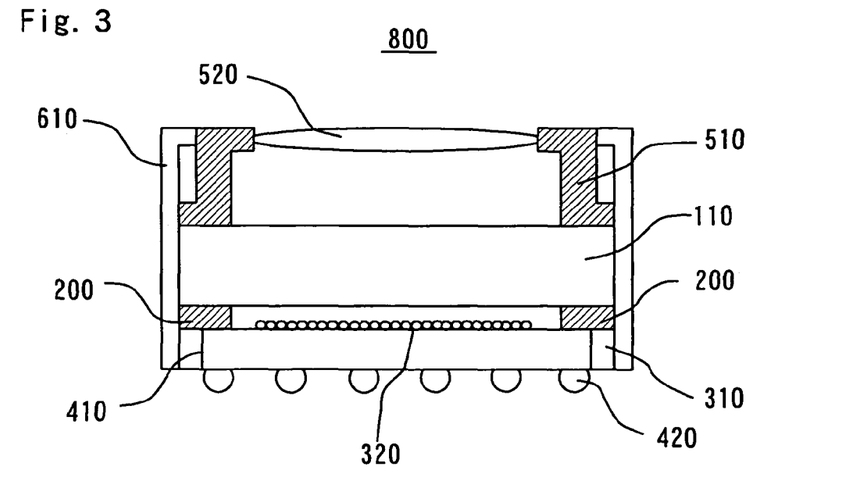
FIG. 3 is a cross-sectional view of a semiconductor device fabricated according to a semiconductor device fabrication method of the present embodiment.

FIG. 3 is a cross-sectional view of an image sensor that is an example of a semiconductor device 800 fabricated according to the present embodiment. On the light receiving surface side of a semiconductor chip 310 made of, e.g., a silicon single crystal or the like, there is formed a solid-state image sensing device 320 constituted by a CCD (Charge Coupled Device), a CMOS (Complementary Metal Oxide Semiconductor), or the like. The solid-state image sensing device 320 is, for example, the same number of light receiving elements as the number of pixels, arranged in a matrix. A transparent glass substrate 110 is stuck to the semiconductor chip 310 to protect the solid-state image sensing device 320 and reinforce the semiconductor chip 310 with an adhesive 200 such that the light receiving surface of a semiconductor chip 310 is parallel to the sticking surface of the glass substrate 110. The adhesive 200 is, for example, epoxy-based photosensitive adhesive resin or the like.

Through electrodes 410 made of metal such as copper are formed extending from the light receiving surface of the semiconductor chip 310 to its back surface. On the back side of the semiconductor chip 310, there are formed external terminals 420 such as BGA (Ball Grid Array) bumps made of, e.g., solder. Lines patterned into configurations as desired (not shown) are formed on the semiconductor chip 310, and the solid-state image sensing device 320 and the through electrodes 410 are electrically connected via the lines. Likewise, the through electrodes 410 and the external terminals 420 are electrically connected via lines (not shown). The external terminals 420 are connected to a printed-circuit board (not shown) having, e.g., an image processing LSI (not shown) mounted thereon, or the like. Note that insulation between the semiconductor chip 310, and the through electrodes 410 and the external terminals 420 is secured by forming an insulating film (not shown) such as a silicon oxide film ($SiO_2$ film) or a silicon nitride film ($Si_3N_4$ film) on the inner surfaces or outer surface of the semiconductor chip 310 as needed.

A lens 520 is fixed to the glass substrate 110 via a lens fixing portion 510 such that light from an image pickup subject is imaged on the surface of the solid-state image sensing device 320. The solid-state image sensing device 320 produces electrical signals corresponding to the intensity of received light and transmits these to an external image processing LSI (not shown) or the like via the through electrodes 410 and the external terminals 420. The image processing LSI produces data of an image or video based on the electrical signals.

Figure 4:
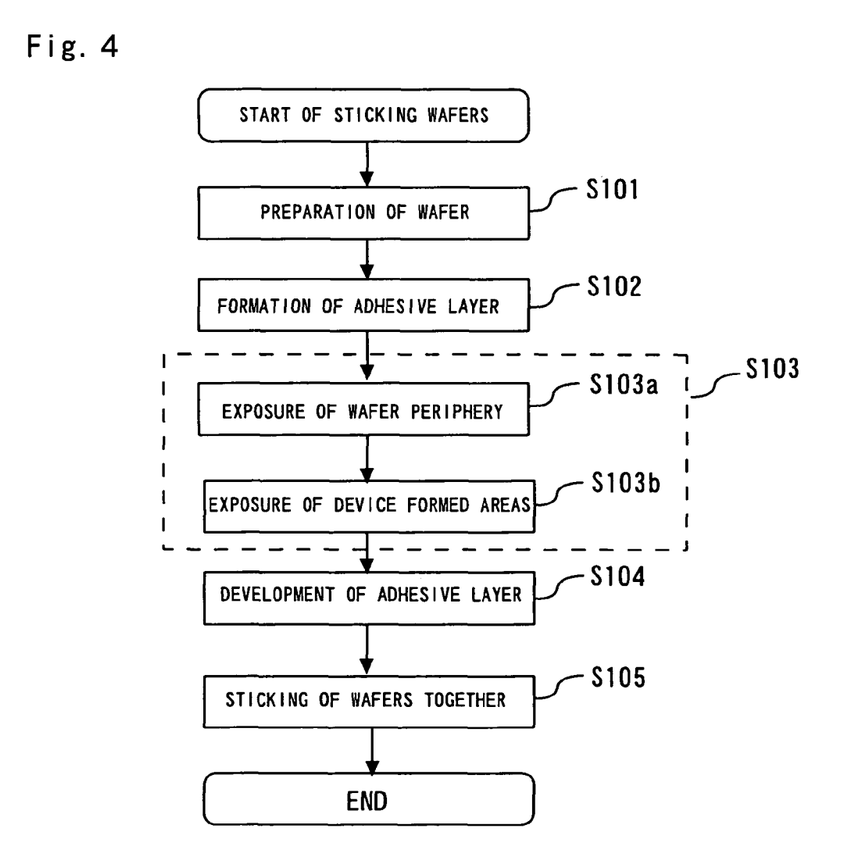
FIG. 4 is a flow chart showing the process of sticking wafers together.

The fabrication method of the semiconductor device 800 according to the present embodiment will be described below. FIG. 4 is a flow chart showing the process of sticking wafers together. The wafer sticking process will be described below with reference to FIG. 4.

Figure 5:
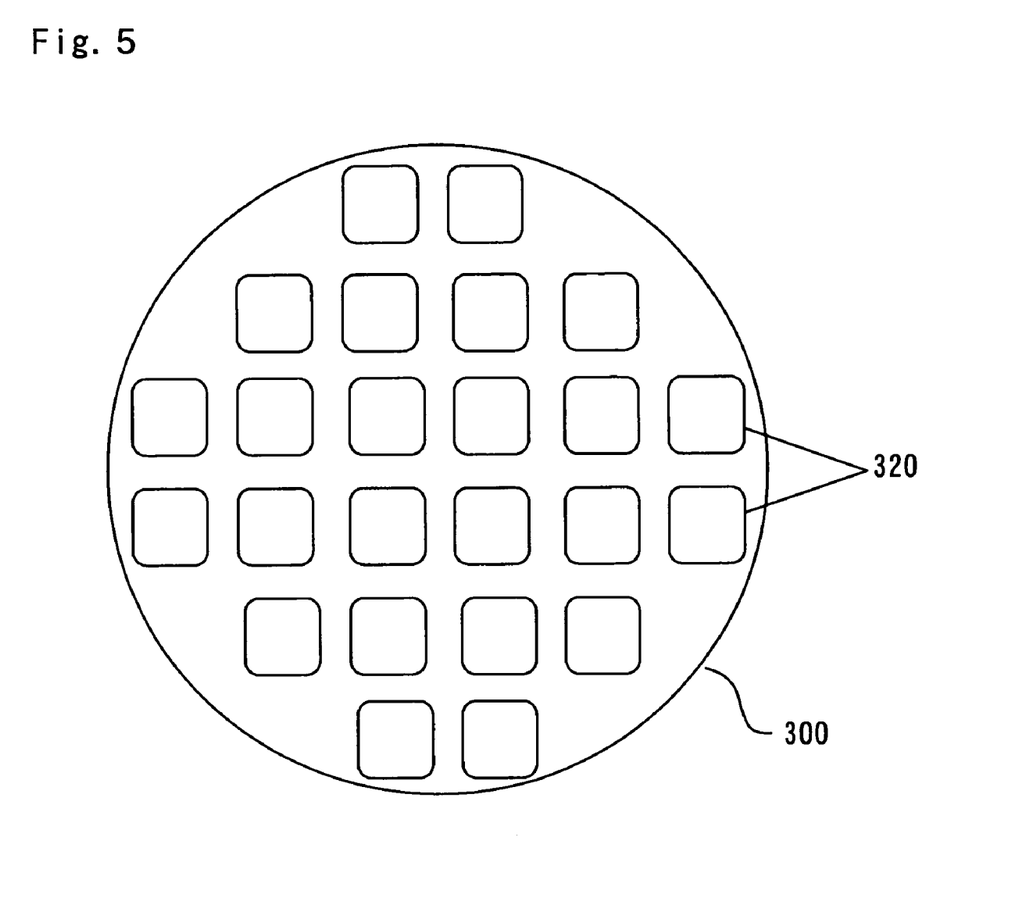
FIG. 5 is a plan view showing a device formed wafer having a plurality of solid-state image sensing devices formed therein.
Figure 6A:
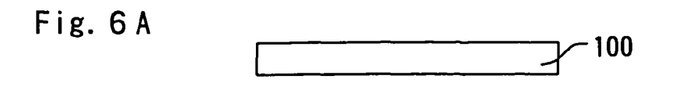
FIG. 6A through FIG. 6F show cross-sectional views of a transparent wafer, the device formed wafer, and the like in the steps of the process of sticking wafers together.

First, a transparent wafer 100 and a device formed wafer 300 are prepared (step S101). FIG. 5 shows the device formed wafer 300. The device formed wafer 300 is made of a silicon single crystal or the like, and in its surface, there are formed a plurality of the solid-state image sensing devices 320 each constituted by, e.g., a CCD, a CMOS, or the like. The area where the solid-state image sensing device 320 is formed is called a device formed area. Note that more solid-state image sensing devices 320 are usually formed in the surface of the device formed wafer 300. The thickness of the device formed wafer 300 is, for example, about 700 mm but not limited to any values. FIG. 6A shows the transparent wafer 100 prepared. The transparent wafer 100 is a glass wafer of usually used material consisting mainly of, e.g., quartz or crystal, or the like and may be covered with a coating. The thickness of the transparent wafer 100 is determined by the pickup optical system of the image sensor that is the semiconductor device 800 and is, for example, about 200 mm. A cleaning treatment and the like are performed on the transparent wafer 100 beforehand as needed.

Figure 6B:
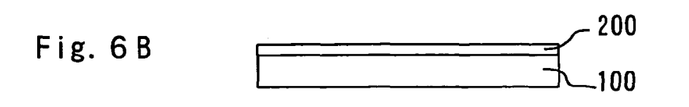

Next, the photosensitive adhesive 200 is coated over a surface of the transparent wafer 100 to form an adhesive layer (step S102). FIG. 6B shows the transparent wafer 100 coated with the adhesive 200. The adhesive 200 is, for example, epoxy-based photosensitive adhesive resin or the like. Here, the adhesive 200 is assumed to be a negative-type photosensitive adhesive, whose exposed parts are left after development. The adhesive 200 is coated by, e.g., a usual spin coat method. The layer thickness of the adhesive 200 is, for example, about several tens mm. The treatments such as heating the transparent wafer 100 coated with the adhesive 200 to an appropriate temperature (e.g., 50° C. to 80° C.) by a hot plate or the like to fix the adhesive 200 are performed as needed. As the adhesive 200, a photosensitive resin sheet may be used, not being limited to these.

Subsequently, the adhesive 200 coated over the transparent wafer 100 is exposed (step S103). The exposure process consists of two processes, an exposure process for the wafer periphery (step S103a) and an exposure process for the device formed areas (step S103b). Here, the wafer periphery exposure process and the device formed-area exposure process are performed in that order.

Figure 7:
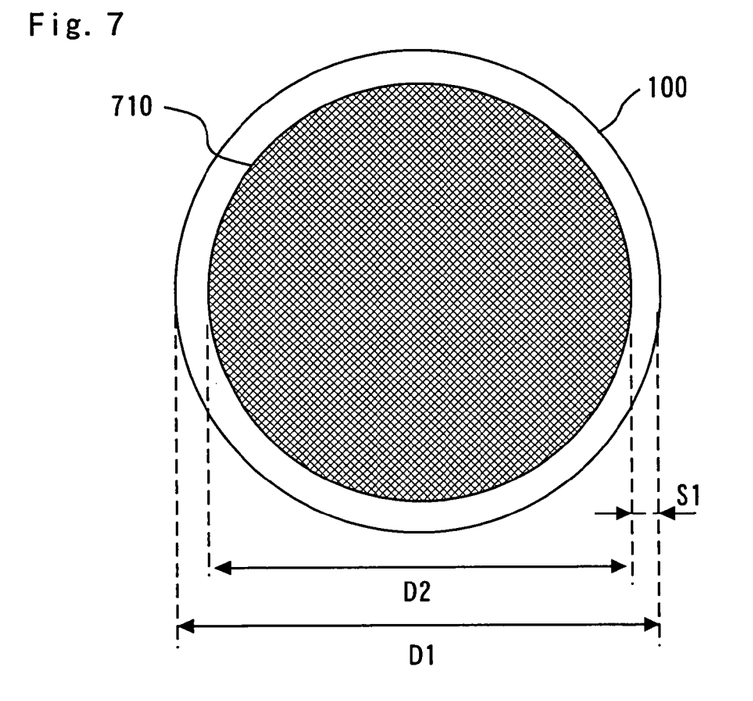
FIG. 7 is a plan view showing the transparent wafer and a periphery exposure mask in a wafer periphery exposure process as viewed from the irradiation light side.

FIG. 7 shows the transparent wafer 100 and a periphery exposure mask 710 in the wafer periphery exposure process (step S103a) as viewed from the irradiation light side. The outline of the periphery exposure mask 710 is formed similar to the outline of the transparent wafer 100 and here is circular like that of the transparent wafer 100. In exposure, the periphery exposure mask 710 and the transparent wafer 100 are aligned such that their centers coincide. The diameter D2 (e.g., 295 mm) of the periphery exposure mask 710 is smaller than the diameter D1 (e.g., 300 mm) of the transparent wafer 100. The distance between the outer edge of the periphery exposure mask 710 and the outer edge of the transparent wafer 100 (hereinafter called an outer edge distance S1) is even over the entire outer edge and is, for example, 1.0 mm. Note that the outer edge distance S1 is adjusted according to the shape of a device form pattern mask 700 used in the subsequent device formed-area exposure process as needed.

Figure 6C:
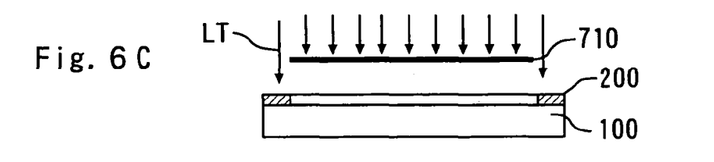
Figure 8:
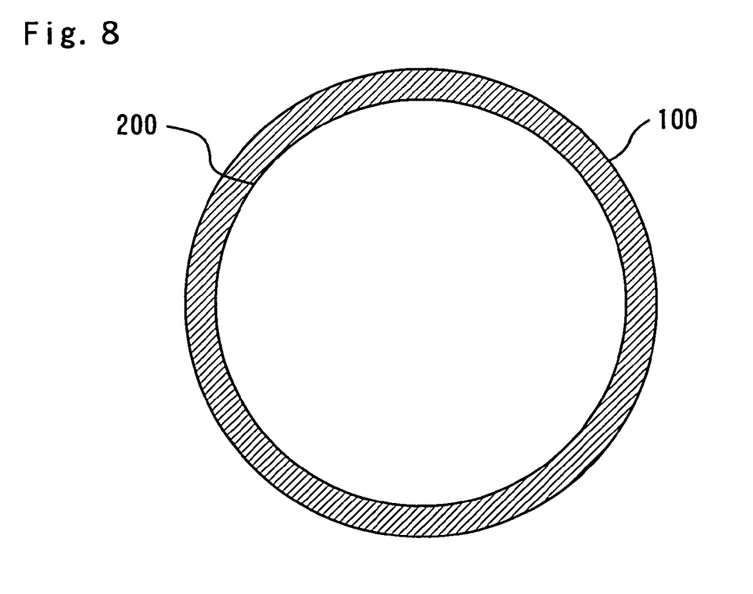
FIG. 8 is a plan view showing the transparent wafer and adhesive after exposure in the wafer periphery exposure process.

FIG. 6C is a cross-sectional view of the transparent wafer 100 and the periphery exposure mask 710 that are aligned with each other. Irradiation light LT consists of three wavelengths of, e.g., g-rays (436 nm in wavelength), h-rays (405 nm), and i-rays (365 nm), and its intensity is about 500 to 2000 mJ. The irradiation light LT is blocked by the entire periphery exposure mask 710. FIG. 8 shows the transparent wafer 100 and the adhesive 200 after exposure in the wafer periphery exposure process. As shown in the figure, of the adhesive 200 coated over the transparent wafer 100, the adhesive part over the entire periphery (hatched region) is exposed. The width of the exposed adhesive part over the periphery is about 1.0 mm, the same as the outer edge distance S1.

Figure 9:
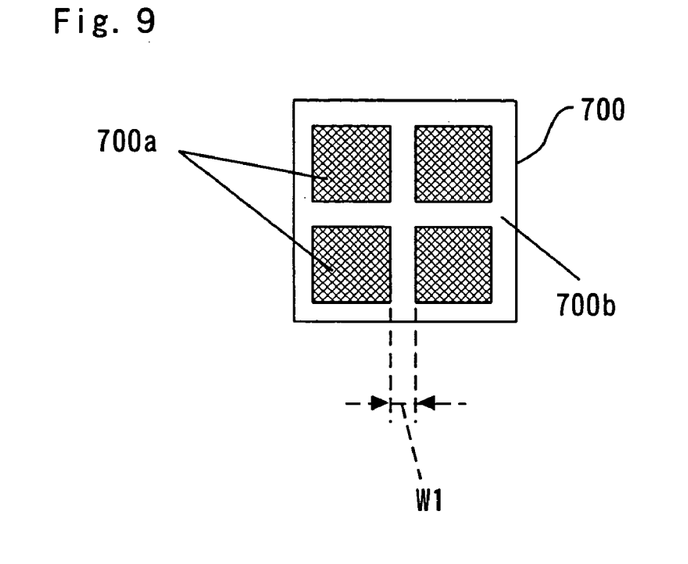
FIG. 9 is a plan view showing a device form pattern mask.

After the completion of exposure for the wafer periphery, the periphery exposure mask 710 is removed, and the device form pattern mask 700 is set, proceeding to the device formed-area exposure process (step S103b). FIG. 9 shows the device form pattern mask 700. On the device form pattern mask 700, rectangular patterns 700a each corresponding to the shape of the device formed area are formed in a matrix of two columns and two rows. The size of the rectangular pattern 700a is, for example, about 1 to 6 mm square for a semiconductor chip for an image sensor. The interval between the rectangular patterns 700a (hereinafter called a pattern interval W1) is about 0.5 mm. The rectangular patterns 700a block the irradiation light when exposed, whereas the open area surrounding the rectangular patterns 700a is a transparent portion 700b and transmits the irradiation light when exposed.

When considering the width of the adhesive 200 left after the subsequent exposure and development, it is desirable that the outer edge distance S1 in the wafer periphery exposure process and the pattern interval W1 in the device formed-area exposure process be in the following relationship, that is, the outer edge distance S1 be twice the pattern interval W1 or greater. Here, the pattern interval W1 is about 0.5 mm, and the outer edge distance S1 is about 1.0 mm.

Figure 10:
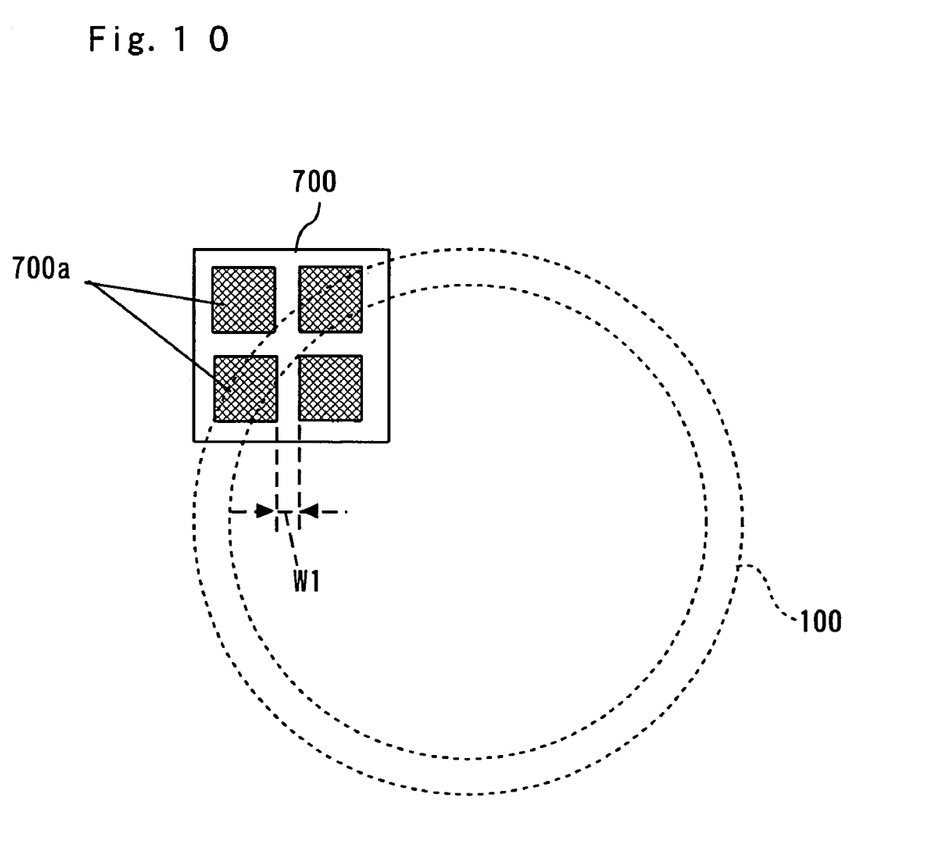
FIG. 10 is a plan view showing the transparent wafer and the device form pattern mask in a device formed-area exposure process as viewed from the irradiation light side.

FIG. 10 shows the transparent wafer 100 and the device form pattern mask 700 in the device formed-area exposure process by a stepper (step S103b) as viewed from the irradiation light side. Exposure by the stepper is performed multiple times while changing the exposure position so as to cover the areas corresponding to all the device formed areas of the device formed wafer. FIG. 10 shows the positional relationship between the transparent wafer 100 and the device form pattern mask 700 at one of multiple exposure times.

Figure 6D:
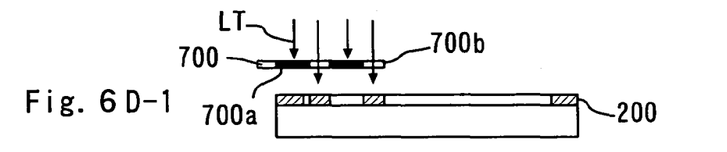
Figure 6D:
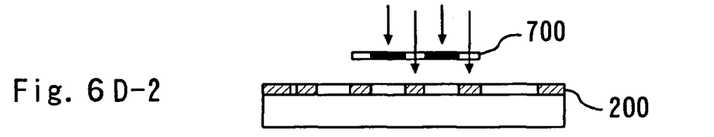
Figure 6D:
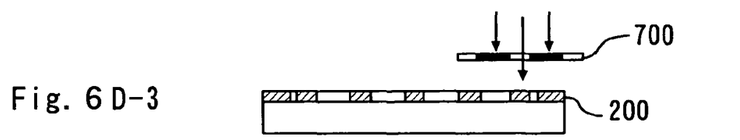

FIG. 6D-1 through FIG. D-3 are cross-sectional views of the transparent wafer 100 and the device form pattern mask 700 that are aligned with each other. Irradiation light LT may be the same in type, also in intensity, as the irradiation light LT in the wafer periphery exposure process. As shown in FIG. 6D-1, the irradiation light LT is blocked by the rectangular patterns 700a so that the parts corresponding to the device formed areas are not exposed. Meanwhile, parts of the adhesive 200 corresponding to the transparent portion 700b are exposed to the irradiation light LT passing through the transparent portion 700b. As shown in FIG. 6D-2 and FIG. 6D-3, exposure is performed over the entire transparent wafer 100 while changing the exposure position.

Then, the adhesive 200 coated over the transparent wafer 100 is developed to remove the non-exposed parts (step S104). FIG. 11 shows the transparent wafer 100 after the development. The hatched parts in the figure are the adhesive 200 left without being removed. On the surface of the transparent wafer 100, there is present the adhesive 200 left over the entire periphery (hereinafter called periphery remaining adhesive 200b) as well as the adhesive 200 left between adjacent adhesive-removed parts 100a corresponding to the device formed areas (hereinafter called a between-device formed area remaining adhesive 200a).

Figure 6E:
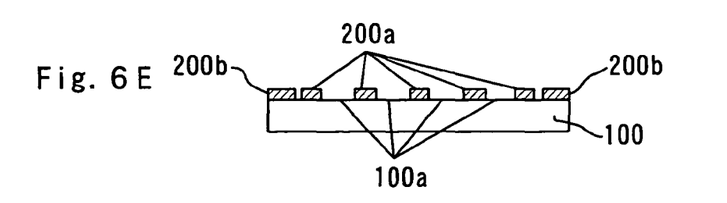

The remaining width W2 of the between-device formed area remaining adhesive 200a is about 0.5 mm according to the pattern interval W1 in the device formed-area exposure process. The remaining width S2 of the periphery remaining adhesive 200b is about 1.0 mm according to the outer edge distance S1 in the wafer periphery exposure process. That is, the adhesive 200 is partially removed such that the remaining width S2 is about twice the remaining width W2. By making the remaining width S2 greater than the remaining width W2, even twice that or greater, the effect of preventing a break-off or a crack from occurring in the device formed wafer 300 in the subsequent back side polishing process is heightened. For example, where the remaining width W2 is 0.5 mm, it is desirable that the remaining width S2 be 1.0 mm or greater. The remaining width S2 may be even about 20 mm, but if the remaining width S2 is too broad, the number of semiconductor chips available from one wafer is reduced. Hence, from the viewpoint of cost of seeking the fabrication of more semiconductor chips, it is especially preferable that whereas the remaining width W2 is 0.5 mm, the remaining width S2 is about 1.0 mm as mentioned above. FIG. 6E is a cross-sectional view of the transparent wafer 100 after the development. On the surface of the transparent wafer 100, there is the periphery remaining adhesive 200b over the periphery as well as the between-device formed area remaining adhesive 200a.

Subsequently, the transparent wafer 100 and the device formed wafer 300 are stuck together with the adhesive 200 left on the transparent wafer 100 (step S105). In the sticking procedure, first the transparent wafer 100 and the device formed wafer 300 are aligned such that formed areas for solid-state image sensing devices (not shown) in the device formed wafer 300 surface coincide with adhesive-removed parts 100a of the transparent wafer 100 surface, and are brought into contact via the adhesive 200. Thereafter, pressure is applied to the transparent wafer 100 and the device formed wafer 300 from both their back sides with heating or so on as needed to cure the adhesive 200, thereby sticking the transparent wafer 100 and the device formed wafer 300 together. Hereinafter, the joined body of the transparent wafer 100 and the device formed wafer 300 is called a joined wafer.

In the joined wafer, the shapes of areas (e.g., 100a-3 in FIG. 11) surrounded by the remaining photosensitive adhesive (periphery remaining adhesive 200b) over the periphery of the transparent wafer 100 and the device formed wafer 300 joined together and the remaining photosensitive adhesive between adjacent device formed areas (between-device formed area remaining adhesive 200a) do not match the shape of the device formed area (where the solid-state image sensing device 320 is formed). The joined wafer fabricated according to the joined wafer fabrication method according to the present embodiment has the above characteristic in terms of appearance.

Figure 6F:
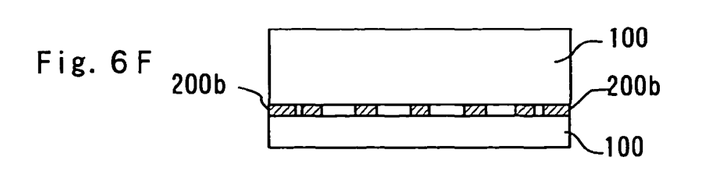

FIG. 6F is a cross-sectional view of the transparent wafer 100 and the device formed wafer 300 stuck together taken along dot-dashed line A2 of FIG. 11. The outline of the transparent wafer 100 is substantially the same as the outline of the device formed wafer 300. The transparent wafer 100 and the device formed wafer 300 are stuck together with the periphery remaining adhesive 200b over the entire periphery that is a sticking portion. Since the formed periphery remaining adhesive 200b covers the entire periphery that is the sticking portion, the periphery remaining adhesive 200b works to prevent foreign matter such as dust, fragments, or the like or liquid such as a chemical solution from entering a formed area for the solid-state image sensing device (not shown) via the sticking portion and sticking, and resultant damage to the wafer even in the case where the transparent wafer 100 and the device formed wafer 300 stuck together is put in circulation. After sticking the wafers together, various chemical solution treatments are performed in the steps until cutting the joined wafer (dividing into chips), but because the periphery remaining adhesive 200b is formed covering the entire periphery that is the sticking portion as described above, for example, in a through electrode and line forming step, a resist for lithography or a chemical solution such as a cleaning solution for wafer surfaces does not enter a formed area for the solid-state image sensing device via the periphery of the wafer to become lees.

Going through the above steps, the process of sticking wafers together finishes. FIG. 12 is a flow chart showing the process of dividing the wafer into chips. The process of dividing the wafer into chips will be described below with reference to FIG. 12.

Figure 13A:
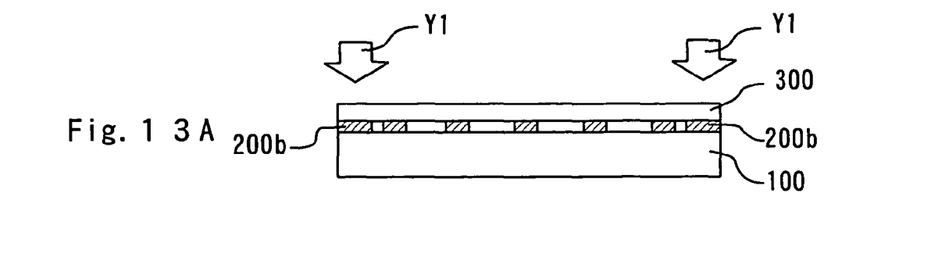
FIG. 13A to FIG. 13C show cross-sectional views of the transparent wafer, the device formed wafer, and the like in the steps of the process of dividing the wafer into chips.

First, in order to make the device formed wafer 300 stuck to the transparent wafer 100 thinner, the device formed wafer 300 is polished at the back side using a wafer polishing apparatus (step S201). FIG. 13A is a cross-sectional view of the device formed wafer 300 and the transparent wafer 100 in the back side polishing process. The amount of polishing is determined by the device formation depth of solid-state image sensing devices formed in the device formed wafer 300, requirements from the structure of a wafer-level package, etc., and the device formed wafer 300 is polished to, e.g., about 100 mm in thickness. The evenness or coarseness of the polished surface need only be of such a level as not to affect the subsequent processes.

The polishing method is a usual back grind method, where pressure due to the grind occurs in the direction of arrow Y1. Because as shown in the figure the periphery of the transparent wafer 100 and the periphery of the device formed wafer 300 are stuck together with the periphery remaining adhesive 200b, which acts against the grind pressure, a break-off or a crack does not occur anywhere from the periphery through the inner part of the device formed wafer 300 when pressure due to the grind is applied to the periphery of the wafer.

Figure 13B:
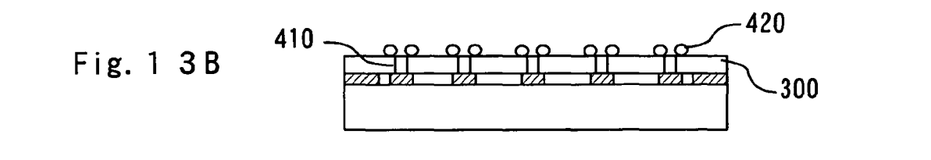

Next, through electrodes 410 and the like are formed in the polished device formed wafer 300 (step S202). FIG. 13B is a cross-sectional view of the device formed wafer 300 and the transparent wafer 100 in the process of forming the through electrodes 410 and the like. The through electrodes 410 made of metal such as copper are formed extending from the light receiving surface side to the back side of the device formed wafer 300. External terminals 420 such as BGA (Ball Grid Array) bumps made of, e.g., solder are formed on the back side of the device formed wafer 300. Further, on the device formed wafer 300, lines patterned into as desired (not shown) are formed to electrically connect the solid-state image sensing devices (not shown) and the through electrodes 410. Likewise, the through electrodes 410 and the external terminals 420 are electrically connected via lines (not shown). The through electrodes 410 and the lines can be formed by, e.g., a usual lithography and etching process. An insulating film (not shown) such as a silicon oxide film ($SiO_2$ film) or a silicon nitride film ($Si_3N_4$ film) is formed on the inner surfaces or outer surface of the device formed wafer 300 as needed to secure insulation between the device formed wafer 300, and the through electrodes 410 and the external terminals 420.

Figure 13C:
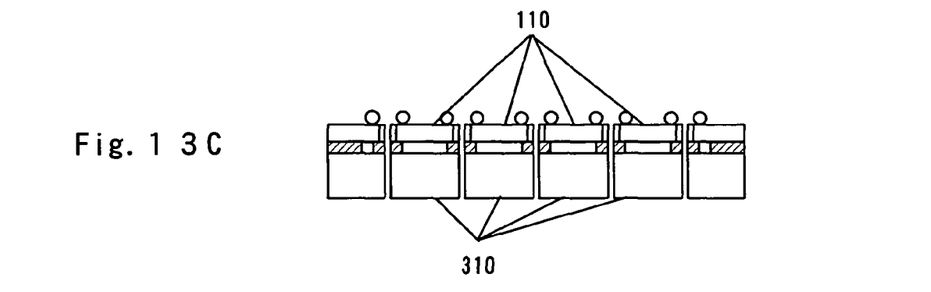
Figure 14:
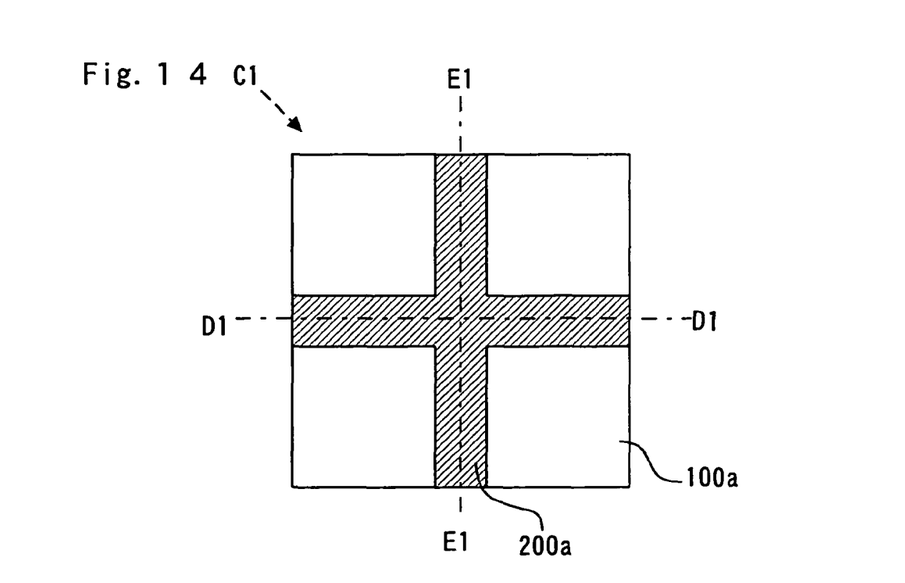
FIG. 14 is an enlarged plan view showing of a portion of the transparent wafer after development.

Subsequently, the transparent wafer 100 and the device formed wafer 300 stuck together with the adhesive 200 are cut into chips (step S203). FIG. 14 is an enlarged view of a region C1 shown in FIG. 11. The transparent wafer 100 and the device formed wafer 300 are cut (diced) along about the center (dot-dashed lines D1, E1 in the figure) of the remaining adhesive 200a between device formed areas into chips so that the peripheries of each chip are stuck together with the remaining adhesive 200a between the device formed areas. FIG. 13C is a cross-sectional view of the joined bodies of the glass substrates 110 and the semiconductor chips 310 obtained by cutting. In each semiconductor chip 310, a solid-state image sensing device (not shown) is formed, and the peripheries of the glass substrate 110 and of the semiconductor chip 310 are stuck together with the adhesive 200.

Going through the above steps, the process of dividing the wafer into chips finishes. After the completion of this process, a lens 520 is fixed to the glass substrate 110 via a lens fixing portion 510, and the joined body is contained in a sealed case 610 for packaging as needed, thereby finishing the semiconductor device 800.

According to the fabrication method of semiconductor devices of the present embodiment, as described above, the adhesive 200 is exposed so as to be left over the entire periphery of the transparent wafer 100. At the subsequent sticking-together step, the peripheries of the transparent wafer 100 and of the device formed wafer 300 are stuck together with the periphery remaining adhesive 200b.

Since being formed covering the entire periphery that is the sticking portion, the periphery remaining adhesive 200b can prevent foreign matter, liquid, or the like from entering a formed area for the solid-state image sensing device via the periphery and sticking, and resultant damage to the wafer even in the case where the transparent wafer 100 and the device formed wafer 300 stuck together is put in circulation. Further, because the periphery remaining adhesive 200b is formed covering the entire periphery that is the sticking portion, after sticking the wafers together, a chemical solution, from chemical solution treatments performed as needed in the steps until cutting the joined wafer (dividing into chips), does not enter a formed area for the solid-state image sensing device via the periphery of the wafer to become lees. By this means, production yields of semiconductor chips sealed with a glass substrate into which the wafer is divided after exposed by a stepper can be improved, and the occurrence of a failure in semiconductor devices comprising the semiconductor chips can be reduced, thus improving their reliability.

In the back side polishing process for the device formed wafer 300, because the periphery remaining adhesive 200b between the peripheries of the transparent wafer 100 and of the device formed wafer 300 with which they are stuck together acts against pressure due to the grind, a break-off or a crack can be prevented from occurring somewhere from the periphery through the inner part (where device formed areas exist) of the device formed wafer 300 when the grind pressure is applied to the periphery of the wafer. By this means, production yields of semiconductor chips sealed with a glass substrate into which the wafer is divided after exposed by a stepper can be improved, and the occurrence of a failure in semiconductor devices comprising the semiconductor chips can be reduced, thus improving their reliability.

By making the remaining width S2 of the periphery remaining adhesive 200b greater than the remaining width W2 of the between-device formed area remaining adhesive 200a, even twice that or greater, the effect of preventing a break-off or a crack from occurring in the device formed wafer 300 in the back side polishing process is heightened. From the viewpoint of cost, it is especially desirable that whereas the remaining width W2 is 0.5 mm, the remaining width S2 be set at about 1.0 mm.

Where the adhesive layer is formed on the surface of the transparent wafer 100, an adhesive layer is not formed on the surface of the solid-state image sensing device 320 formed in the surface of the device formed wafer 300. Hence, damage to or a failure in operation of the solid-state image sensing device 320 due to the adhesive 200 sticking to or permeating into the solid-state image sensing device 320 can be avoided, and thus semiconductor devices of high reliability can be produced.

The transparent wafer 100 and the device formed wafer 300 stuck together may be put in circulation in the market, or divided chips obtained through the processes of the wafer back side polishing, the formation of electrodes and the like, the wafer cutting, and so on, or the semiconductor device 800 obtained by packaging the divided joined body of the glass substrate 110 and the semiconductor chip 310 may be put in circulation.

Although in the present embodiment the adhesive 200 is coated over the surface of the transparent wafer 100, instead an adhesive layer may be formed by the adhesive 200 or a photosensitive resin sheet over a surface of the device formed wafer 300. In this case, the exposure and development of the adhesive 200 will be performed on the device formed wafer 300 in the same way.

Although in the present embodiment the wafer periphery exposure process and the device formed-area exposure process are performed in that order, performing them in the reversed order, that is, in the order of the device formed-area exposure process and the wafer periphery exposure process will produce the same effect.

Although in the present embodiment an image sensor in a chip size package is fabricated as the semiconductor device 800, a sensor semiconductor device such as an illuminance sensor or a UV sensor may be fabricated, and the invention can be applied to semiconductor devices having a semiconductor chip to which a glass substrate is stuck in their package.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. A method of fabricating a joined wafer, which comprises at least:
 a wafer preparing step of preparing a transparent wafer and a device formed wafer having device formed areas in its surface;
 an adhesive layer forming step of forming a negative-type photosensitive adhesive layer over a surface of said transparent wafer or said device formed wafer;
 an adhesive layer exposure step of exposing at least a portion of the photosensitive adhesive layer formed over said transparent wafer or said device formed wafer;
 an adhesive layer developing step of developing the photosensitive adhesive layer formed over said transparent wafer or said device formed wafer to remove part thereof; and
 a wafer sticking step of sticking said transparent wafer and said device formed wafer together with the photosensitive adhesive layer left on said transparent wafer or said device formed wafer so as to be a joined wafer,
 wherein said adhesive layer exposure step comprises:
 a device formed-area exposure step of exposing by a stepper such that parts of the photosensitive adhesive layer formed over said transparent wafer or said device formed wafer are removed, said parts corresponding to said device formed areas when said transparent wafer and said device formed wafer are stuck together; and
 a wafer periphery exposure step of exposing such that a portion of the photosensitive adhesive layer over the periphery of said transparent wafer or said device formed wafer is left.

2. A method of fabricating a joined wafer according to claim 1, wherein in said adhesive layer exposure step, exposure is performed such that a remaining width of a portion of the photosensitive adhesive layer over the periphery of said transparent wafer is greater than a remaining width of a portion of the photosensitive adhesive layer corresponding to areas between adjacent ones of said device formed areas.

3. A method of fabricating a joined wafer according to claim 2, wherein said remaining width of a portion of the photosensitive adhesive layer over the periphery of said transparent wafer is twice, or greater than twice, said remaining width of a portion of the photosensitive adhesive layer corresponding to areas between adjacent ones of said device formed areas.

4. A method of fabricating a joined wafer according to claim 3, wherein said remaining width of a portion of the photosensitive adhesive layer corresponding to areas between adjacent ones of said device formed areas is 0.5 mm or greater, and said remaining width of a portion of the photosensitive adhesive layer over the periphery of said transparent wafer is 1.0 mm or greater.

5. A method of fabricating a joined wafer according to claim 1, wherein in said adhesive layer forming step, said photosensitive adhesive layer is formed over a surface of said transparent wafer.

* * * * *